US011230250B2

(12) United States Patent
Sturm et al.

(10) Patent No.: US 11,230,250 B2
(45) Date of Patent: Jan. 25, 2022

(54) RESTRAINT DEVICE FOR REDUCING AN ABRUPT SIDEWARD MOVEMENT AND/OR FORWARD MOVEMENT OF AN OCCUPANT

(71) Applicant: ISI AUTOMOTIVE HOLDING GMBH, Vienna (AT)

(72) Inventors: Andreas Karl Richard Sturm, Berlin (DE); Marcus Bernd Mueller, Berlin (DE); Sebastian Biehle, Berlin (DE); Andrej Lerch, Berlin (DE); Sebastian Schneiderreit, Berlin (DE)

(73) Assignee: ISI AUTOMOTIVE HOLDING GMBH, Vienna (AT)

( * ) Notice: Subject to any disclaimer, the term of this patent is extended or adjusted under 35 U.S.C. 154(b) by 188 days.

(21) Appl. No.: 16/446,894

(22) Filed: Jun. 20, 2019

(65) Prior Publication Data

US 2019/0389421 A1 Dec. 26, 2019

(30) Foreign Application Priority Data

Jun. 20, 2018 (DE) .................... 10 2018 114 771.6

(51) Int. Cl.
*B60R 21/231* (2011.01)
*B60R 21/207* (2006.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC ............ B60R 21/23138; B60R 21/207; B60R 2021/23146; B60R 21/233;
(Continued)

(56) References Cited

U.S. PATENT DOCUMENTS 5,636,862 A * 6/1997 Cheung ................. B60R 21/207
280/730.2
5,730,464 A * 3/1998 Hill .................... B60R 21/23138
280/730.2
(Continued)

FOREIGN PATENT DOCUMENTS

DE 20 2006 010 878 U1 9/2006
DE 10 2005 059 197 A1 7/2007
(Continued)

OTHER PUBLICATIONS

DE Office Action dated Oct. 29, 2018 as received in Application No. 102018114771.6.

*Primary Examiner* — Karen Beck
(74) *Attorney, Agent, or Firm* — Maschoff Brennan

(57) ABSTRACT

The invention relates to a restraint device, in particular for a motor vehicle, for reducing an abrupt sideward movement of an occupant in the case of an impact with an airbag which is inflatable by means of a gas generator when an accident situation occurs. It is provided that the airbag has at least one side chamber and one shoulder chamber which are connected together, wherein in the inflated state of the airbag the side chamber and the shoulder chamber form different main extension planes which run at an angle to one another. An anchoring strap is fastened at one end to the shoulder chamber and at the other end to the vehicle seat. The shoulder chamber comprises two regions which transition into one another and which together form a reverse U-shape, the base thereof in the inflated state of the shoulder chamber forming the upper end thereof.

20 Claims, 8 Drawing Sheets

(51) Int. Cl.
  *B60R 21/233* (2006.01)
  *B60R 21/2338* (2011.01)
  *B60R 21/00* (2006.01)
(52) U.S. Cl.
  CPC .. *B60R 21/2338* (2013.01); *B60R 2021/0048* (2013.01); *B60R 2021/23146* (2013.01)
(58) Field of Classification Search
  CPC ........ B60R 21/2338; B60R 2021/0048; B60R 2021/23308; B60R 2021/23382; B60R 2021/23386
  See application file for complete search history.

(56) References Cited

U.S. PATENT DOCUMENTS

| | | | |
|---|---|---|---|
| 7,240,915 B2* | 7/2007 | Peng | B60R 21/23138 280/730.2 |
| 7,798,520 B2* | 9/2010 | Feller | B60R 21/23138 280/729 |
| 8,091,920 B2 | 1/2012 | Loibl et al. | |
| 8,360,469 B2 | 1/2013 | Wiik et al. | |
| 8,684,408 B2 | 4/2014 | Thomas et al. | |
| 9,428,135 B1 | 8/2016 | Thomas et al. | |
| 9,592,788 B2 | 3/2017 | Wiik et al. | |
| 9,994,181 B1* | 6/2018 | Dubaisi | B60R 21/207 |
| 10,300,878 B2* | 5/2019 | Park | B60R 21/2171 |
| 10,814,824 B2* | 10/2020 | Song | B60R 21/207 |
| 10,870,405 B2* | 12/2020 | Kwon | B60R 21/207 |
| 2004/0007905 A1* | 1/2004 | Acker | B60R 21/23138 297/216.13 |
| 2005/0236819 A1 | 10/2005 | Riedel et al. | |
| 2006/0131847 A1* | 6/2006 | Sato | B60R 21/23138 280/730.2 |
| 2007/0158933 A1* | 7/2007 | Siemiantkowski | B60R 21/207 280/730.1 |
| 2009/0200775 A1 | 8/2009 | Sugimoto et al. | |
| 2010/0314859 A1* | 12/2010 | Tomitaka | B60R 21/232 280/730.2 |
| 2012/0091695 A1* | 4/2012 | Richez | B60R 21/207 280/729 |
| 2014/0062069 A1* | 3/2014 | Fukawatase | B60R 21/207 280/730.2 |
| 2014/0151984 A1* | 6/2014 | Fukawatase | B60R 21/23138 280/730.2 |
| 2015/0314748 A1* | 11/2015 | Mihm | B60R 21/2338 280/730.2 |
| 2016/0107604 A1* | 4/2016 | Fujiwara | B60R 21/23138 280/729 |
| 2017/0334386 A1* | 11/2017 | Park | B60R 21/2171 |
| 2019/0054890 A1* | 2/2019 | Kwon | B60R 21/23138 |
| 2019/0092271 A1* | 3/2019 | Park | B60R 21/207 |
| 2019/0161052 A1* | 5/2019 | Steiner | B60R 21/23138 |
| 2020/0331424 A1* | 10/2020 | Cord | B60R 21/233 |
| 2020/0339060 A1* | 10/2020 | Wiscombe | B60R 21/23138 |

FOREIGN PATENT DOCUMENTS

| | | |
|---|---|---|
| DE | 10 2009 019 930 A1 | 2/2010 |
| DE | 10 2011 081 478 A1 | 3/2012 |
| DE | 10 2012 216 896 A1 | 3/2013 |
| DE | 10 2016 100 114 A1 | 7/2016 |
| DE | 10 2016 101 860 A1 | 8/2016 |
| DE | 20 2017 1 03 033 U1 | 6/2017 |
| EP | 1 588 907 A1 | 10/2005 |
| EP | 2 981 441 B1 | 10/2017 |
| WO | WO-2021019842 A1 * | 2/2021 ......... B60R 21/2338 |

* cited by examiner

RESTRAINT DEVICE FOR REDUCING AN ABRUPT SIDEWARD MOVEMENT AND/OR FORWARD MOVEMENT OF AN OCCUPANT

REFERENCE TO RELATED APPLICATION

This application claims priority to German Patent Application No. 10 2018 114 771.6 filed on Jun. 20, 2018, the entirety of which is incorporated by reference herein.

FIELD OF THE INVENTION

The present invention relates to a restraint device, in particular for a motor vehicle, for reducing an abrupt sideward movement and/or forward movement of an occupant.

BACKGROUND TO THE INVENTION

It is known to use restraint devices for reducing and/or limiting the freedom of movement of an occupant in the event of a side impact, said restraint devices comprising an airbag which is inflatable by means of a gas generator when an accident situation occurs.

In this case, increasingly in addition to so-called center airbags which in the inflated state extend downwardly from the roof liner between the seats or, starting from the central console, extend upwardly in the direction of the roof liner between the seats or in the inflated state extend from the rear seat row to the front as far as the front windshield, so-called interaction airbags are also used, said interaction airbags being arranged in one side of a side rest of the vehicle seat facing a vehicle interior. To that effect, DE 10 2016 101 860 A1 discloses an airbag which is arranged by means of at least one fastening element at an associated fastening point along the side rest on the vehicle seat.

In other words, in the inflated state the airbag is located between the driver and the front seat passenger, whereby at least any injuries caused by an impact with a fellow passenger arranged in the same seat row are prevented or at least reduced. Furthermore, the risk of injury due to any part of the vehicle interior is reduced by means of such an airbag. These interaction airbags, however, have the drawback that they are pushed away and/or folded away when the vehicle occupant plunges therein, by the arrangement thereof along the side rest located in the vehicle interior, whereby the protective effect is reduced and/or is significantly impaired, partially as a function of the momentum of the side impact, since no restraint is ensured for the occupant in the seat and potential injuries, in particular head injuries, may arise due to the relatively large freedom of movement.

It is, therefore, an object of the invention to provide a restraint system by which the occupant is firstly held in the seat and is secondly retained in the occurrence of an accident. In other words, the occupant who, due to a side impact moves with a sideward movement and potentially a partial forward movement, is retained, pushed back into the seating position and secured there.

SUMMARY

According to an aspect of the invention a restraint device is provided in which the airbag is arranged by means of at least one fastening element at an associated vehicle seat fastening point on a side of a side rest of a vehicle seat facing a vehicle interior. The restraint device comprises at least one anchoring strap, the one end thereof being fastened at an anchoring point to the vehicle seat and the other end thereof being fastened at an airbag fastening point to the airbag.

It is provided that the airbag has at least one side chamber and one shoulder chamber, which are mechanically connected together and may be connected together in terms of flow technology (which is not necessarily the case in variants). In the inflated state of the airbag the side chamber and the shoulder chamber form different main extension planes which run at an angle to one another. It is further provided that the airbag fastening point is configured on the shoulder chamber so that the anchoring strap is fastened at one end to the shoulder chamber.

In this case, in the inflated state the side chamber is arranged between the front seats, wherein the shoulder chamber adjoins the side chamber at the top so that in the inflated state the shoulder chamber constitutes the chamber which is furthest removed from a backrest.

Since in the inflated state of the airbag the side chamber and the shoulder chamber form different main extension planes, it may be achieved that the airbag is closely adjacent to the occupant at the side, additionally and specifically in the shoulder region. Since the anchoring strap is also fastened to the shoulder chamber, in the occurrence of an accident the occupant and/or the upper body thereof is retained by the shoulder chamber and pushed back into the seating position and/or held therein. The airbag is prevented from being folded away or pushed away.

In this case, the main extension plane of the shoulder chamber and/or the side chamber is understood as the plane in which the respective airbag chamber forms the largest surface when it has been compressed by two hypothetical plates arranged in parallel. In other words: when the inflated airbag chamber is compressed (naturally by the discharge of gas) by two plates arranged in parallel, the airbag chamber being located therebetween, this results in an airbag chamber which is compressed flat. The surface which the compressed airbag chamber adopts is larger or smaller depending on how the two plates which are arranged in parallel are spatially oriented. The orientation of the plates which are arranged in parallel and in which the airbag chamber thus compressed takes up the largest surface corresponds to the main extension plane of the respective airbag chamber. If the airbag chamber under consideration is configured to be mirror-symmetrical, the or one plane of symmetry typically runs in or parallel to the main extension plane.

According to an aspect of the present invention, it is also provided that the shoulder chamber comprises two regions which transition into one another and which together form a reverse U-shape, the base thereof in the inflated state of the shoulder chamber forming the upper end thereof. In this case, the one first region is connected to the side chamber (also in terms of flow technology in variants) and the other second region is folded back onto the side chamber. The region which is folded back onto the side chamber faces the occupant.

As a result, a reduction in an abrupt sideward and/or forward movement of an occupant is achieved, in particular also an abrupt forward movement. An occupant and/or the upper body thereof is retained in the manner of a scoop in and/or during the occurrence of an accident, so that the occupant is held on the seat and/or even partially pushed back onto the seat, wherein the shoulder chamber at least partially encloses the shoulder of the occupant.

In this case, the two regions of the shoulder chamber which together form a reverse U-shape are preferably arranged substantially symmetrically to one another, wherein the plane of symmetry between the two regions forms the main extension plane of the shoulder chamber.

The main extension plane of the shoulder chamber in this case is automatically angled-back relative to the main extension plane of the side chamber. This has the result that the second region of the shoulder chamber is folded back onto the side chamber. The geometric center of gravity of the shoulder chamber is thus located outside the main extension plane of the side chamber so that to a certain extent the shoulder chamber is bent back and its main extension plane accordingly runs at an angle from the main extension plane of the side chamber.

It may further be provided that the region of the shoulder chamber which is folded back onto the side chamber is connected to the side chamber by means of a sail-like portion. Such a sail-like portion is, for example, triangular. Said sail-like portion is, for example, configured at the upper end of the inflated airbag remote from the vehicle seat.

An embodiment of the invention provides that the side chamber forms a main extension plane which substantially extends in the vehicle longitudinal direction and the vehicle vertical direction. A further embodiment of the invention provides that the shoulder chamber forms a main extension plane which extends substantially in the vehicle longitudinal direction and obliquely to the vehicle vertical direction and at the same time extends in the direction of the shoulder of an occupant seated in the associated vehicle seat. Viewed from the front (counter to the direction of travel of the vehicle seat installed in a vehicle) the side chamber thus extends in the vehicle vertical direction and then adjoins the shoulder chamber which is angled-back from the occupant. As a result, in combination with the anchoring strap, the occupant moving in a sideward and optionally partially forward movement is retained.

A further embodiment of the invention provides that in the inflated state of the airbag the main extension planes of the side chamber and the shoulder chamber adopt an angle of 50 degrees to 130 degrees, preferably 70 degrees to 110 degrees to one another. In this case, it is provided that the side chamber and the shoulder chamber transition into one another by means of a bent region, wherein the main extension planes intersect in the bent region. The bent region in this case constitutes a transition region between the shoulder chamber and the side chamber. In other words, in the inflated state of the airbag two planes intersecting in the bent region are formed by the side chamber and the shoulder chamber.

In an embodiment, the shoulder chamber is arranged in the vicinity of a neck support of the vehicle seat by means of the at least one anchoring strap, i.e. the one end of the anchoring strap is fastened to the vehicle seat in the vicinity of the neck support. In and/or during the occurrence of an accident, this has the effect that the occupant and/or the upper body thereof is retained by the airbag in the manner of a scoop and held on the seat and/or even partially pushed back onto the seat, wherein the shoulder chamber at least partially encloses the shoulder of the occupant. Moreover, by the arrangement in the vicinity of the neck support, in the deploying and/or inflating process of the airbag the anchoring strap does not push onto the body of the occupant, so that firstly it does not lead to any constrictions of the body of the occupant and secondly it does not lead to the occupant being potentially displaced and/or pushed away out of the seat.

In order to ensure a high restraining force and any adaptations of the restraint device to the seat, it is also possible that the anchoring strap is arranged centrally at a central anchoring point on the airbag side on the seat frame. It is also conceivable that the anchoring strap is arranged at an anchoring point in the center of the seat or on a side opposing the airbag at an anchoring point on the seat frame.

In order to overcome the above-described drawback of EP 1 588 907 A1 of the occupant being pushed away and/or displaced out of the seat and in order to prevent the occupant from being potentially pushed forward by the anchoring strap and any constrictions, in the case of an anchoring point at the center of the seat or in the case of an anchoring point which is arranged on a side opposing the airbag on a region on the vehicle door side on the seat frame, the anchoring strap is deflected via a deflection point, which is arranged on the airbag side on the seat frame, from the airbag fastening point to the anchoring point on the vehicle seat.

To this end, the deflection point is arranged on the seat frame at a height such that in the case of a person of average height, (depending on the specification this corresponds to a 5th, 50th or 95th percentile dummy—in this case depending on the country and specification it refers to an ES-2, ES-2r, SID-IIs or World SID (Side Impact Dummy) the deflection point is located at a height between the upper arm and the ribcage of the occupant.

In detail, depending on the height of the shoulder chamber this possibly also encompasses the chest, abdomen and partially the shoulder of the occupant opposite the airbag on the vehicle door side, whereby increased safety is ensured. It is also technically possible that the shoulder chamber is made up of a plurality of smaller chambers—which are oriented longitudinally relative to the vehicle height, whereby an improved enclosure of the shoulder region and possibly the chest region may be achieved. Such chamber arrangements are well known in the field of airbag development, for example EP 2 981 441 B1 discloses such a chamber arrangement for a knee protection device in the transverse direction, an improved adaptation to a curvature of an instrument panel below a steering wheel being able to be achieved by said arrangement.

A further embodiment provides that the side chamber is of annular configuration in order to reduce and/or prevent a potential space problem of the airbag with the vehicle interior when the airbag is inflated, wherein a spatial region, which is enclosed by the side chamber of annular configuration, may be gas-free in the inflated state of the side chamber or the airbag. This results in less gas being required from the gas generator for filling the airbag, whereby consequently the gas generator itself may also be configured to be smaller. The ring which is formed by the side chamber defines a main extension plane of the side chamber, wherein the main extension plane of the side chamber is the plane formed by the ring.

In order to carry out production in the simplest possible manner, in a further embodiment of the invention the spatial region enclosed by the side chamber of annular configuration is configured by means of two superimposed fabric layers of the airbag. In this case, it should be mentioned that the airbag is generally configured from two superimposed fabric layers. This has the advantage that the production of the airbag is simpler and more cost-effective, since potentially costly blanks are not required. Naturally, it is also possible that the spatial region has only one fabric layer or no fabric layer at all, and in this case it is possible to reach through the side chamber. In detail, the spatial region serves for receiving the lateral upper body region in the vehicle center, i.e. for example in the case of a front seat passenger the left arm and the outer region of the left shoulder. By receiving the arm and the associated shoulder part the spatial region serves, in particular, for positioning the shoulder chamber of the airbag.

In order to carry out simpler bending back of the shoulder chamber from the side chamber, in order to ensure the retention and enclosure of the occupant in a manner which is as rapid as possible in and/or during the occurrence of an accident, in an embodiment of the invention the side chamber and the shoulder chamber are at least partially separated from one another in terms of flow technology by means of a stitched portion. By such a partial separation in terms of flow technology the bent region and/or transition region is able to be bent more easily and/or does not have the same stiffness of the remaining airbag. It is also technically conceivable that the side chamber and the shoulder chamber are fully separated from one another in terms of flow technology, wherein the shoulder chamber in this case is configured so as to be able to be filled by a separate gas generator or by means of a branching arranged on the gas generator.

A partial separation of the side chamber and the shoulder chamber in terms of flow technology may be implemented in the simplest manner by means of an internal retainer strap which has through-holes for the through-flow of gas or may be implemented by means of an internal partition which does not reach as far as the two lateral edge regions and thus ensures two laterally arranged flow paths. In the same manner, the internal partition may have only one lateral edge region for the throughflow of the gas or may be generally configured to be gas-permeable. In an alternative embodiment it is also possible that at least one so-called dart is arranged between the two chambers. This is a partial stitched portion of the two fabric layers between the two chambers, whereby the above-described effect of a delayed gas flow is also able to be achieved.

In order to ensure a deployment and/or filling of the airbag which is as rapid as possible, in a preferred embodiment the gas generator is arranged on the side chamber such that when an accident situation occurs said side chamber is initially able to be filled with gas. To this end, the side chamber preferably has a gas inlet opening which is configured in the form of an inlet connection element. Naturally in an alternative embodiment it is also possible that a gas distributor, for example in the form of a T-piece, is arranged on the gas generator, the two chambers being able to be filled in parallel thereby with gas, simultaneously or with a time delay, wherein the chambers are still connected together in terms of flow technology via the gas distributor. In this case, different alternative embodiments are known to a person skilled in the art in the field of airbag development.

When an accident situation occurs, the embodiment according to the invention thus permits a shoulder region of the occupant to be able to be retained by means of the shoulder chamber, i.e. even when the occupant is already moving in a sideward and/or possibly forward movement due to the acceleration forces produced by the accident inflating the airbag, in particular the shoulder chamber thereof, retains at least the shoulder region of the occupant and pushes it back into the seating position. In other words, by means of the airbag the occupant is retained in the manner of a scoop and held on the seat.

In order to ensure this effect of the retention of the occupant in the manner of a scoop and also a more effective retention, the inflated airbag protrudes in the vehicle vertical direction—taking into account the inclination of the backrest and/or along the plane thereof—at a vertical spacing of 50 mm to 300 mm, preferably 150 mm, beyond the seat frame in the direction of the roof liner. Additionally, in the same manner the airbag protrudes in the vehicle width direction at a horizontal spacing of 0 mm to 190 mm, preferably 160 mm, from a side region of the seat frame 12 facing the vehicle center, in the direction of the vehicle door, in order to ensure by at least partially enclosing the occupant that the occupant is restrained to the greatest possible extent.

In an alternative embodiment, an additional airbag is arranged on the side rest of the vehicle seat on the vehicle door side, wherein the additional airbag is preferably configured so as to correspond to the airbag in the vehicle center. By an arrangement of the restraint system according to the invention on both side rests of the vehicle seat, a protection of the vehicle occupant is provided irrespective of the position of the vehicle seat in the vehicle. Such safety systems will be particularly important in the future during periods of autonomous driving.

According to a further embodiment, the invention provides that in the deployed/inflated state the airbag is supported on a central console. This embodiment has the advantage that the anchoring strap does not have to be fastened at its one end in the vicinity of the neck support on the vehicle seat, such that the shoulder chamber is positioned by means of the anchoring strap in the vicinity of the neck support. In detail, in this case the forces produced by the occupant when plunging into the airbag are at least partially absorbed by the central console, for which purpose the side chamber is optionally configured to be longer than in the embodiments described above.

It is also possible that the side chamber and the shoulder chamber adopt an angle of 45 to 120 degrees, preferably 70 to 100 degrees, from one another so that the shoulder chamber is arranged approximately perpendicular to the head of an occupant. This is preferably achieved by means of the sail-like portion, wherein it is also possible to achieve this by means of potential retainer straps and by tightening and/or stretching one of the two superimposed layers which in the connected and/or bonded and/or stitched state form the airbag. It may further be provided that one of the two layers is configured to be longer in comparison with the opposing layer and has a Z-shaped flap, i.e. a fold is incorporated.

BRIEF DESCRIPTION OF THE FIGURES

For further explanation of the invention in the following part of the description, reference is made to the figures from which further embodiments, details and developments of the invention may be derived. In this case.

DETAILED DESCRIPTION

Figure 1:
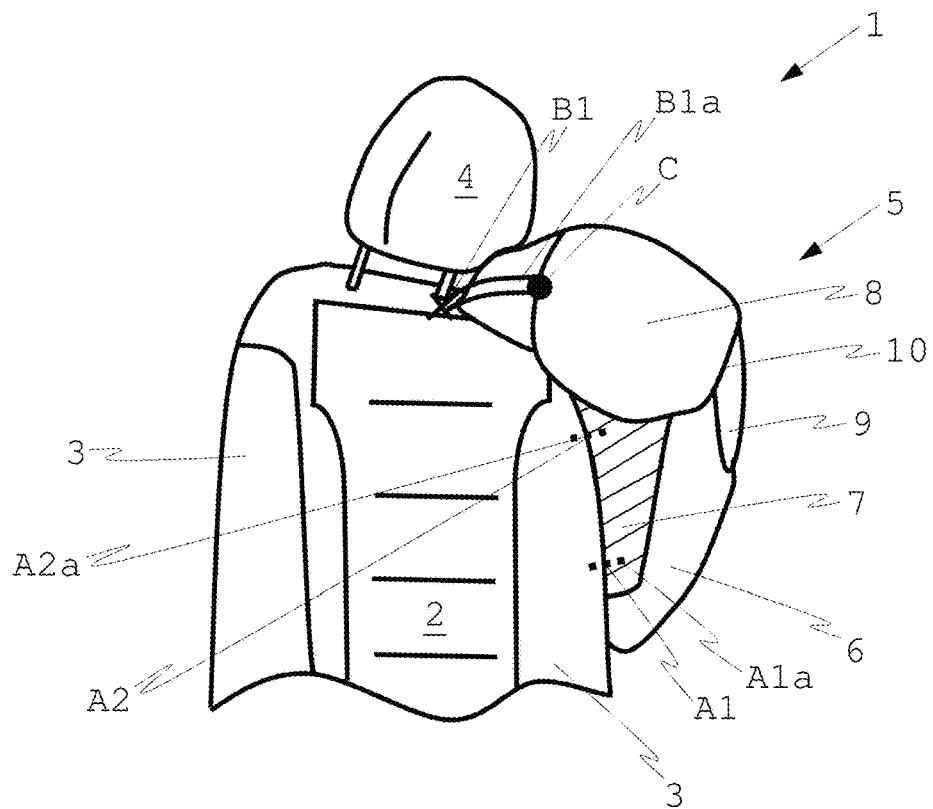
FIG. 1 shows a perspective view of a restraint device according to the invention in the deployed/inflated state.
Figure 2:
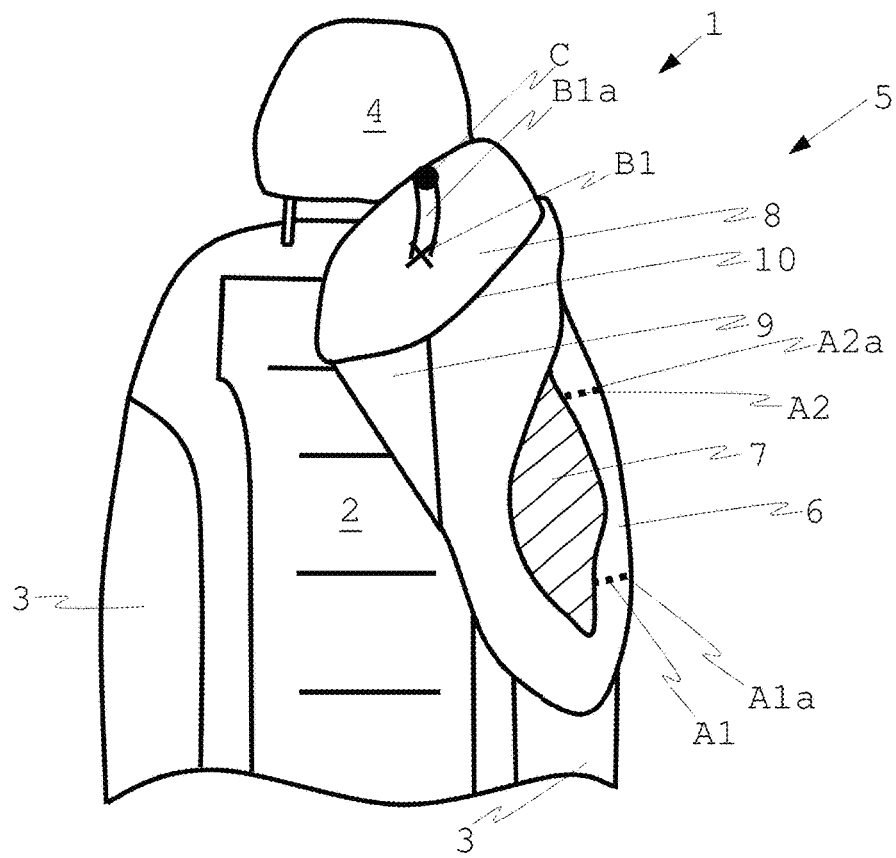
FIG. 2 shows a front view of the restraint device according to the invention in the deployed/inflated state.

FIG. 1 and FIG. 2 show different perspectives of a restraint device 1 according to the invention, in particular for a motor vehicle for reducing an abrupt sideward and forward movement of an occupant in the case of an impact with an airbag 5 which is able to be inflated by means of a gas generator when an accident situation occurs, said airbag being arranged by means of at least one fastening element A1a, A2a at an associated fastening point A1, A2 on a side of a side rest 3 of a vehicle seat 2 facing a vehicle interior.

The restraint device further comprises an anchoring strap B1a, the one end thereof being fastened at an anchoring point B1 to the vehicle seat 2 and the other end thereof at an airbag fastening point C to the airbag 5. It should be mentioned here that the anchoring strap B1a in this case is arranged and runs outside the airbag 5 and accordingly is fastened from outside at the airbag fastening point C to the airbag 5. This applies to all exemplary embodiments of the invention.

Figure 3:
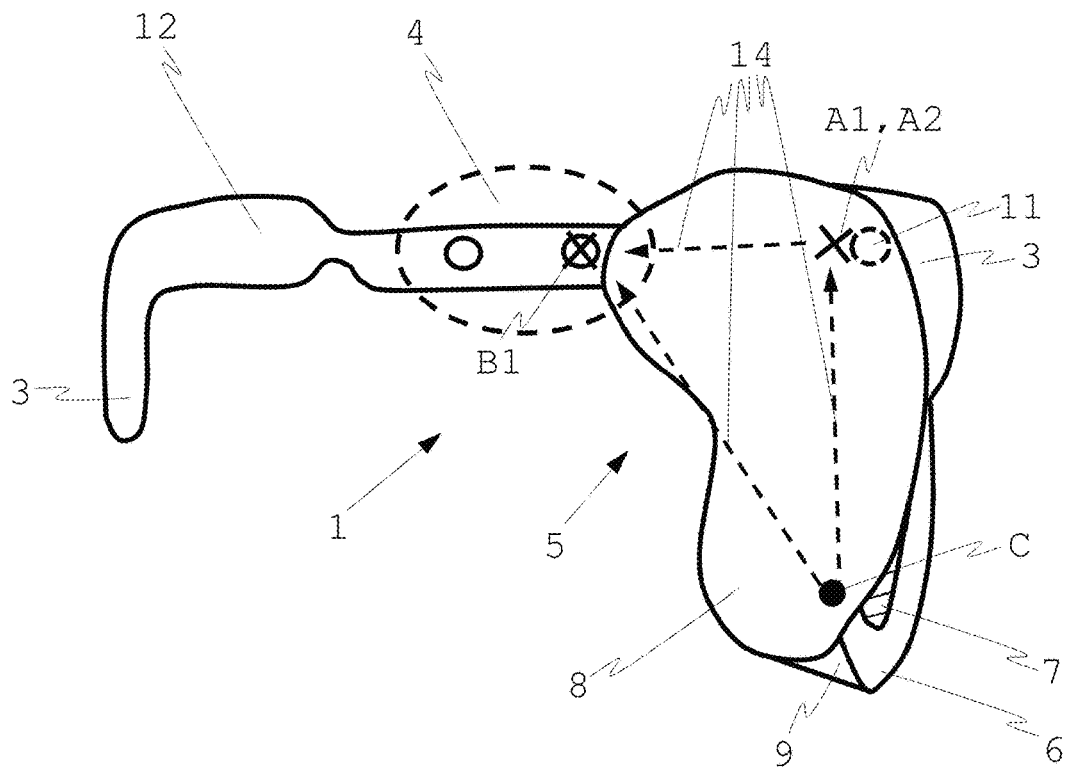
FIG. 3 shows a plan view of the restraint device according to the invention in the deployed/inflated state, wherein only one seat frame is shown with the restraint device according to the invention.

In this case, in the inflated state of the airbag 5 the fastening element A1a, A2a, together with this anchoring strap B1a and the fastening points thereof form a force triangle 14, see also FIG. 3 relative thereto. This force triangle 14 formed by at least one fastening point A1, A2 on the vehicle seat 2, a fastening point C on the airbag 5, an anchoring point B1 on the vehicle seat 2 and an associated anchoring strap B1a, constitutes an advantageous means for restraining and thus protecting the occupant in the occurrence of an accident, since by such a construction any folding away and/or pushing away of the airbag 5 is avoided.

Moreover, the production of the force triangle 14 in comparison with other known safety concepts is relatively simple and may naturally be adapted to any vehicle seat 2, wherein care merely has to be taken that the anchoring point B1 arranged on the vehicle seat 2 is located at a position at which it may not result in any painful constrictions of the occupant by the anchoring strap B1a.

The term "force triangle" is to be understood in that the at least one fastening point A1, A2 on the vehicle seat 2, the fastening point C on the airbag 5 and the anchoring point B1 on the vehicle seat 2 are connected by force via the anchoring strap B1a and the airbag material.

In order to ensure a secure restraint of the occupant 13 (see FIG. 8) the airbag 5 has at least one side chamber 6 and one shoulder chamber 8 which are connected together and are separated from one another and/or transition into one another by a bent region 10, wherein the anchoring strap B1a is arranged at the fastening point C on the shoulder chamber 8. In detail, the shoulder chamber 8 serves to enclose the occupant 13 in an accident situation as securely as possible, at least partially in the shoulder region and/or optionally depending on the severity of the accident and/or the momentum of the impact also to retain and to push the occupant back onto the vehicle seat 2.

In order to ensure this, in the deployed, inflated state of the airbag 5 the side chamber 6 and the shoulder chamber 8, namely the main extension planes thereof in the bent region 10, adopt an angle of 50 degrees to 130 degrees, preferably 70 degrees to 110 degrees, from one another. To this end, it is also visible in FIG. 2 that the side chamber 6 and the shoulder chamber 8 in the inflated state of the airbag 5 form two main extension planes intersecting in the bent region 10.

Figure 15:
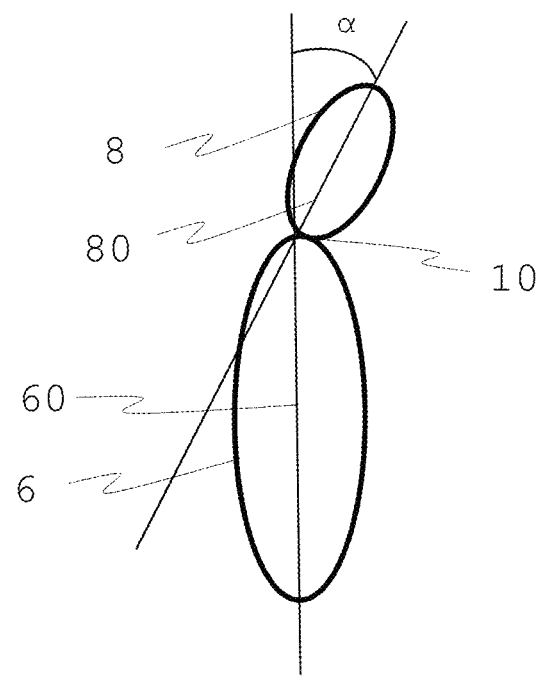
FIG. 15 shows schematically an airbag with a shoulder chamber and a side chamber, the main extension planes thereof being configured at an angle to one another.

The formation of the main extension planes is illustrated schematically in FIG. 15. This shows in a view from the front (counter to the direction of travel) the inflated airbag with the shoulder chamber 8 and side chamber 6. The side chamber 6 forms a main extension plane 60 which substantially extends in the vehicle longitudinal direction and the vehicle vertical direction. The shoulder chamber 8 forms a main extension plane 80 which extends substantially in the vehicle longitudinal direction and obliquely to the vehicle vertical direction and at the same time in the direction of the shoulder of an occupant seated in the vehicle seat. The two chambers 6, 8 adopt relative to one another an angle α which preferably is in the region of 50 degrees to 130 degrees, preferably 70 degrees to 110 degrees. The bent region 10 is configured in the transition region between the two chambers 6, 8.

In FIG. 15 the airbag 5 and/or the side chamber 6 and the shoulder chamber 8 are shown only schematically. However, it generally applies that provided no rotational symmetry is present, a main extension plane of a three-dimensional object, such as the side chamber 6 and the shoulder chamber 8, may be defined. As will be further described, according to a variant of the invention the shoulder chamber 8 is formed by two regions which form a reverse U-shape, wherein the one region is folded back onto the side chamber and stitched thereto on the edge side. In such a case, the main extension plane of the shoulder chamber 8 runs along the plane of symmetry of the U-shape, i.e. between and parallel to the two arms of the U-shape.

Figure 4:
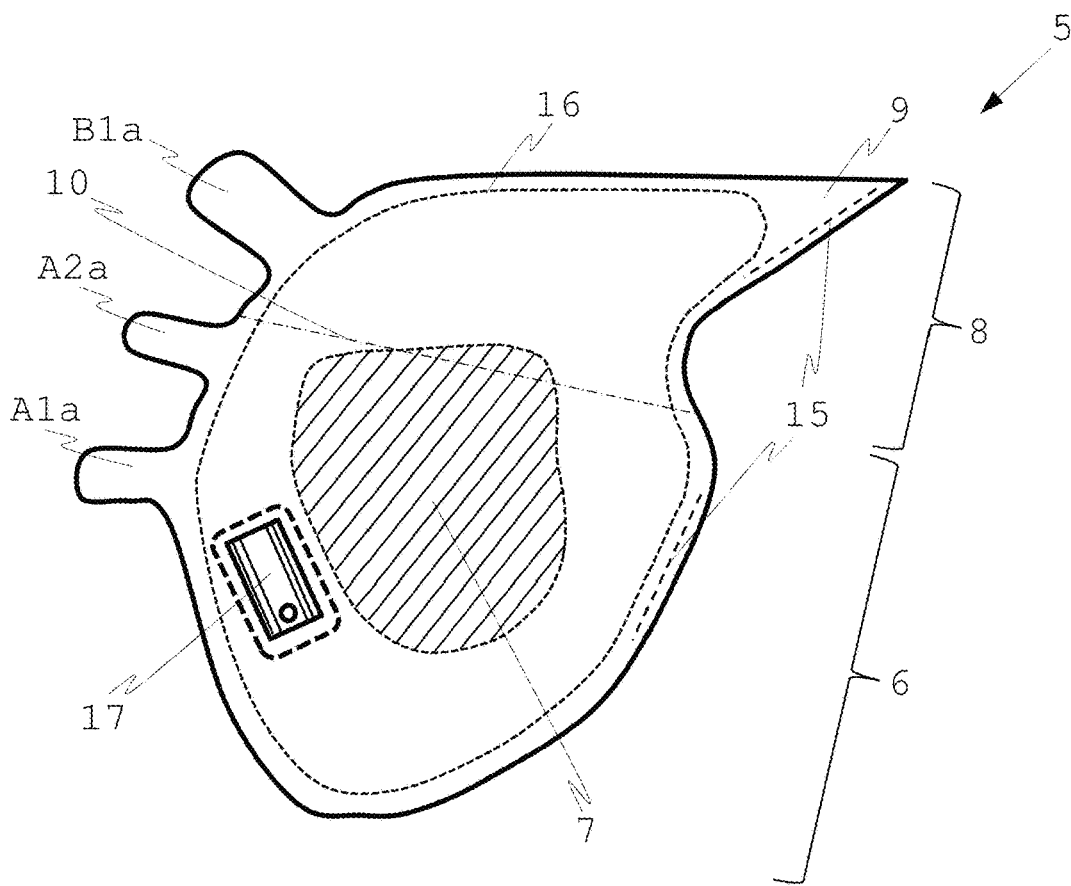
FIG. 4 shows a plan view of an airbag according to the invention in the state spread out flat.

FIG. 4 shows the airbag 5 according to the invention in the state spread out flat, wherein for simpler illustration a sail-like portion 9 arranged on the shoulder chamber 8 is not connected to the side chamber 6. Instead, a sail-like portion seam 15 is shown, the sail-like portion 9 arranged on the shoulder chamber 8 acting thereon in the region of the side chamber 6 in the fully stitched state of the airbag 5. In this case, for simpler illustration the bent region 10 which separates the shoulder chamber 8 from the side chamber 6 is also illustrated. Additionally shown is a gas generator inlet 17 for receiving a gas generator 11 and a peripheral seam 16 by which two superimposed airbag films are connected together to form the airbag 5. In this case a spatial region 7, which is enclosed by the side chamber 6 of annular configuration and which in the inflated state of the airbag 5 is gas-free, is also shown by means of hatching. Additionally, the fastening elements A1a and A2a for fastening the airbag 5 to the vehicle seat 2 and the anchoring strap B1a by which the shoulder chamber 8 is connected to the vehicle seat 2 are shown.

As a result, the airbag shown in FIG. 4 is fully assembled by the sail-like portion 9 and thus the upper region of the airbag shown in FIG. 4 being folded down, wherein a connection to the side chamber 6 is produced via the sail-like portion seam 15. As a result, a U-shaped shoulder chamber 8 is produced (wherein the U-shape is reversed), said shoulder chamber consisting of two regions. In this case, the one first region directly adjoins the side chamber 6 and is connected thereto in terms of flow technology. The other second region is folded back onto the side chamber 6. The second region is also connected in terms of flow technology to the side chamber 6—via the first region. Since the shoulder chamber 8 thus comprises two regions substantially adjacent to one another (as defined above the first and second region), the center of gravity thereof is located outside the main extension plane of the side chamber 6, which leads to it running as a whole in an inclined manner relative to the main extension plane of the side chamber 6, so that its own main extension plane is configured at an angle to the main extension plane of the side chamber.

It should be mentioned that the bending line which is produced when the sail-like portion 9 and thus the upper part of the airbag is folded down, is not identical to the bent region 10 but is located above the bent region 10. This is obvious by the upper sail-like portion seam 15 being at a greater distance from the bent region 10 than the lower sail-like portion seam 15.

Figure 5:
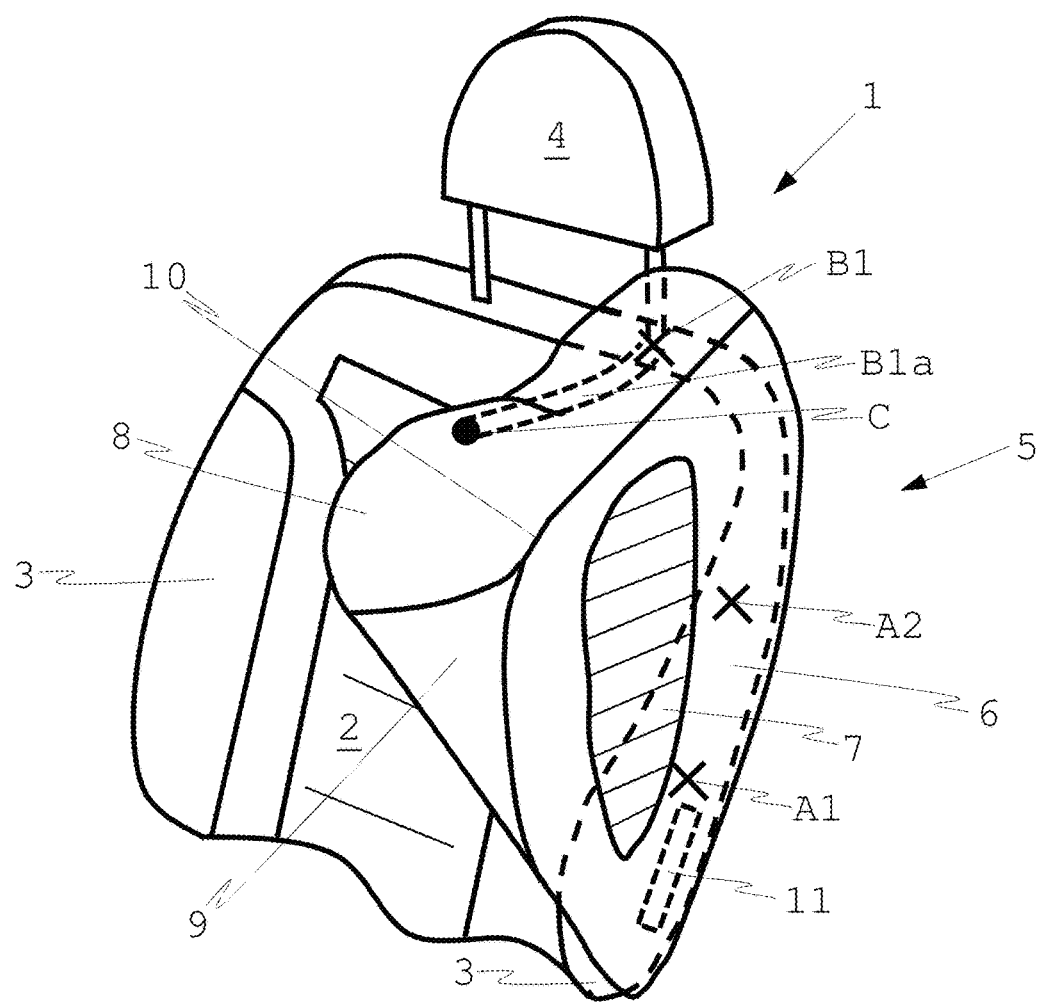
FIG. 5 shows a perspective view of the restraint device according to the invention in the deployed/inflated state.
Figure 9:
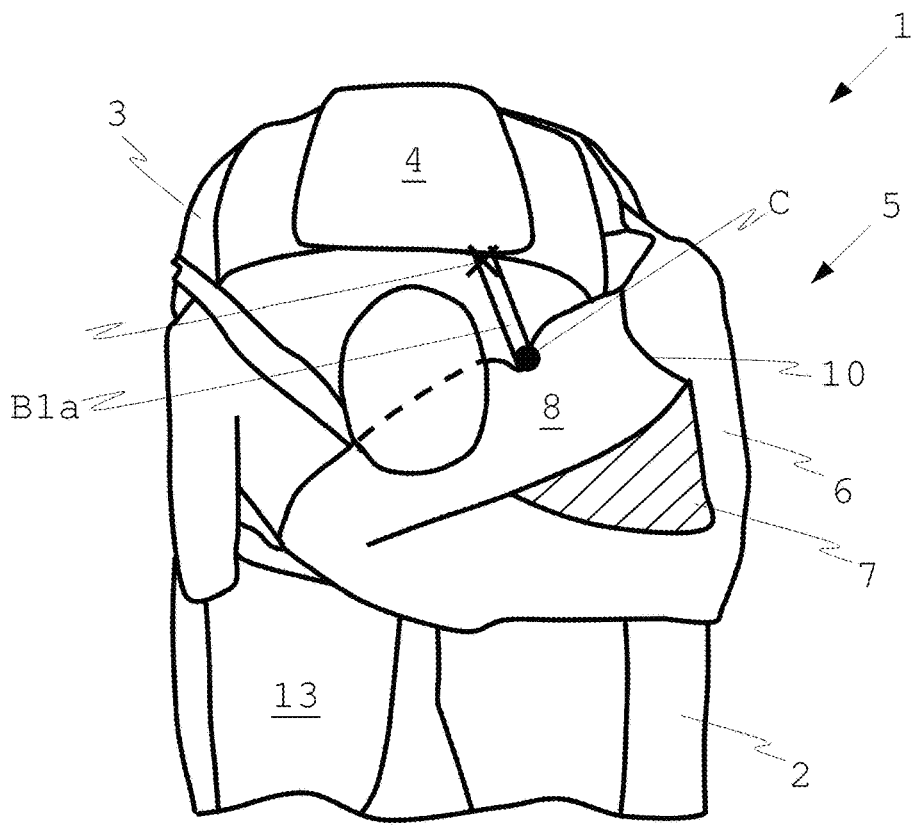
FIG. 9 shows a plan view of a first embodiment according to the invention of the restraint device in the deployed/inflated state, wherein an anchoring strap is arranged on an upper region of the seat frame.
Figure 13:
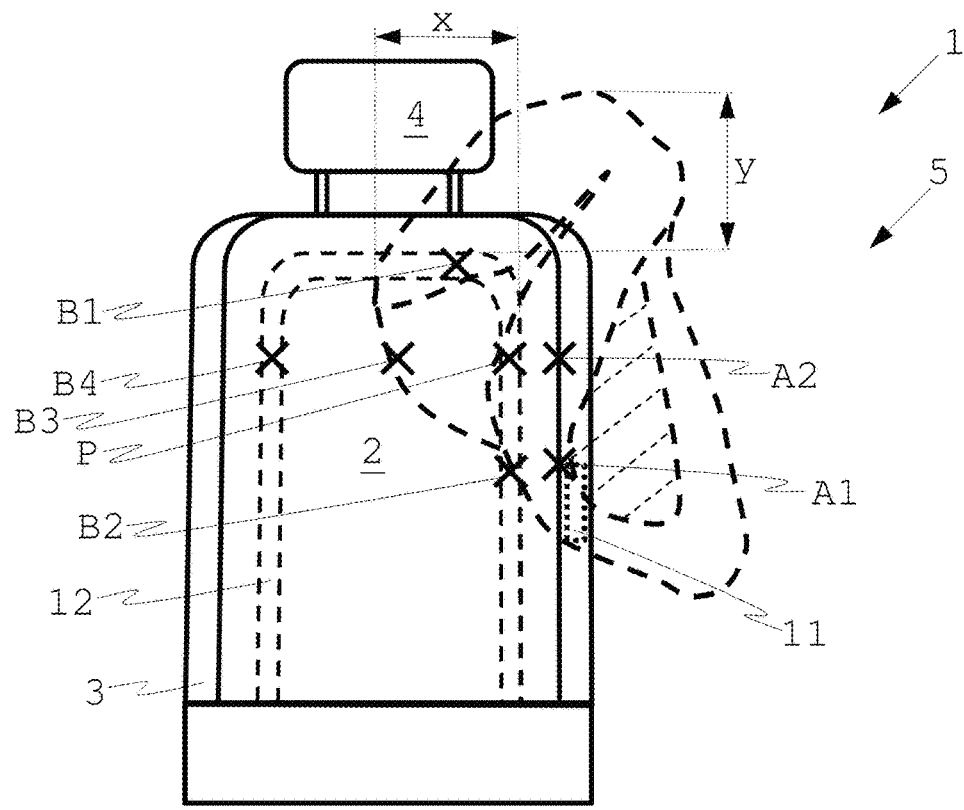
FIG. 13 shows a front view of the seat frame of the seat and a schematic view of the restraint device according to the invention in the deployed/inflated state, wherein the possible anchoring points along the seat frame are shown.

In a preferred embodiment as shown in FIG. 1, FIG. 3 and FIG. 5, the shoulder chamber 8 is arranged by means of the at least one anchoring strap B1a on the airbag side in the vicinity of a neck support 4 at the anchoring point B1 of the vehicle seat 2, see also FIG. 9 and FIG. 13. Relative thereto in a plan view, the formation of the force triangle 14 by the at least one fastening element A1a, A2a with the anchoring strap B1a, which connects the shoulder chamber 8 at the anchoring point B1 in the region below the neck support 4, is illustrated in the inflated state of the airbag 5 in FIG. 3.

Figure 6:
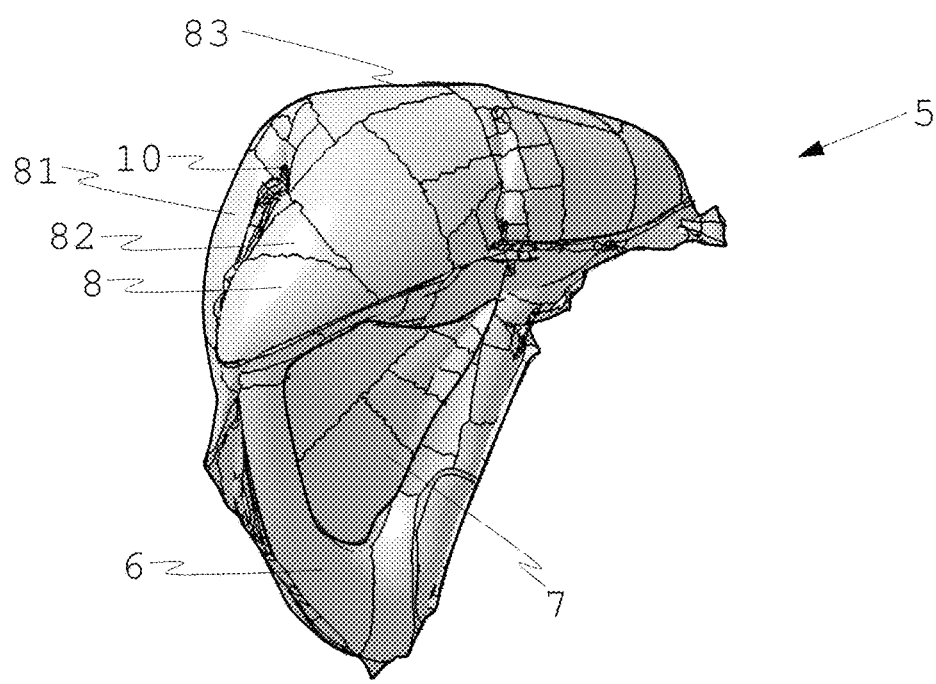
FIG. 6 shows a side view of the airbag according to the invention in the deployed/inflated state.
Figure 7:
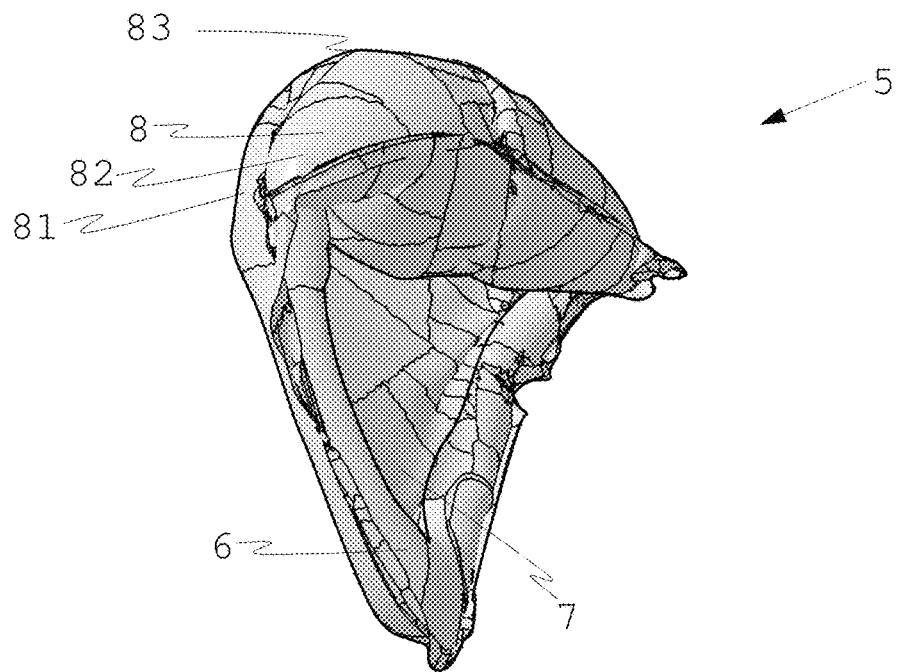
FIG. 7 shows a perspective view of the airbag according to the invention in the deployed/inflated state.

FIG. 6 shows a side view and FIG. 7 shows a perspective view of the airbag 5 according to the invention in the deployed/inflated state. In this case, in contrast to the remaining figures, FIGS. 6 and 7 show the airbag configured on the driver's seat whilst the remaining figures show the airbag configured on the front passenger seat. According to FIGS. 6 and 7, therefore, relative to the drawing plane the driver and/or occupant is located in front of the airbag 5 shown.

According to FIGS. 6 and 7 the shoulder chamber 8 is bent around the bent region 10 in the direction of the side chamber 6 (in an accident situation over the shoulder of the occupant 13). In this case it is clearly visible that the side chamber 6 is configured to be very flat in comparison with the shoulder chamber 8, not only due to the spatial region 7 which is gas-free. By means of a shoulder chamber 8 which is configured to be robust and which in the inflated state of the airbag 5 fully encloses the shoulder of the occupant 13 and retains the shoulder of the occupant in the manner of a scoop, an absorption of the forces acting on the shoulder of the occupant 13 which is as complete as possible is ensured in order to provide the greatest possible restraint.

It should also be mentioned that the first and second regions of the shoulder chamber 8 described with reference to FIG. 4, which form a reverse U-shape, are also visible in FIGS. 6 and 7. The first region which adjoins the side chamber 6 is characterized by the reference numeral 81. The second region which is folded back onto the side chamber is identified by the reference numeral 82. The base of the reverse U-shape located at the top of the airbag 5 is identified by the reference numeral 83.

Figure 8:
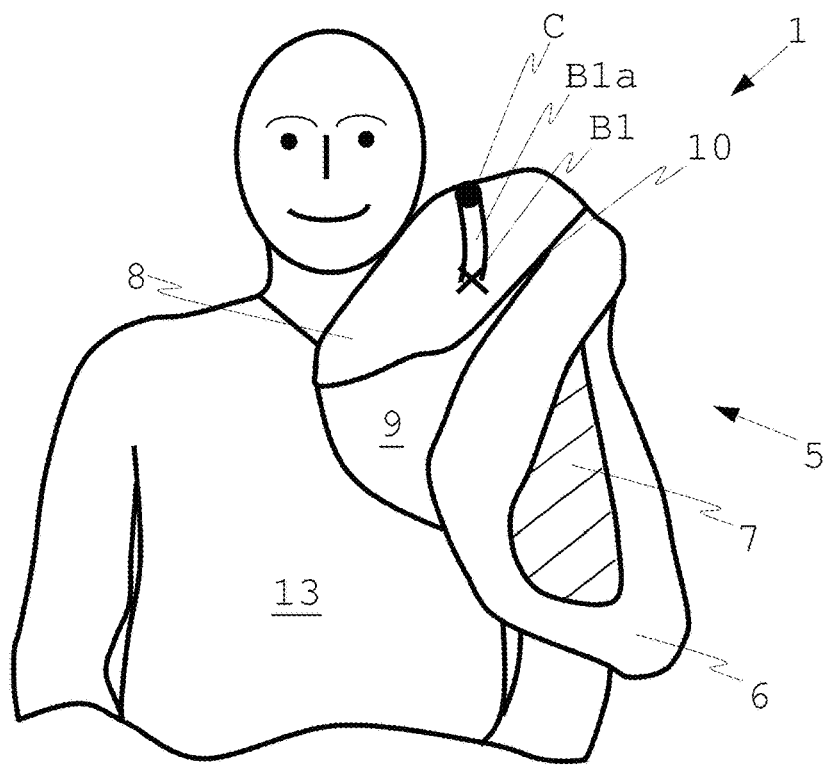
FIG. 8 shows a front view of the restraint device according to the invention in the deployed/inflated state, wherein this restraint device holds back an occupant and for a simplified view no vehicle seat is shown.

FIG. 8 shows a front view of the restraint device 1 according to the invention in the deployed and/or inflated state with the occupant 13, wherein the restraint device 1 holds back the occupant 13. In this case, for a simplified view no vehicle seat 2 is shown. In the inflated state, the shoulder chamber 8 encloses the shoulder of the occupant 13 so that said occupant is pushed into the vehicle seat 2. As a result, in the case of a side impact it is no longer possible and/or virtually no longer possible that the occupant 13 potentially collides with a front seat passenger or the vehicle interior. By enclosing the shoulder with the shoulder chamber 8 it is additionally achieved that the occupant 13 is protected from any forward movement.

FIG. 8 also shows clearly that the chambers 6, 8, which are connected together in a region opposing the vehicle seat 2 and/or the occupant 13, are connected by means of a sail-like portion 9 in one embodiment, wherein the sail-like portion 9 is preferably configured to be triangular with an angle of 50 degrees to 130 degrees, preferably 70 degrees to 110 degrees. This sail-like portion additionally protects the occupant 13 from any forward movement during the occurrence of an accident, so that the occupant 13 is pushed into the vehicle seat 2.

FIG. 1 and FIG. 2 and FIG. 5 to FIG. 12 also show that the side chamber 6 is preferably of annular configuration. The ring which is formed in this case defines the main plane of extension of the side chamber 6. An annular configuration of the side chamber 6 serves to overcome any space problems with the vehicle interior when inflating the airbag 5, wherein the spatial region 7 which is enclosed by the side chamber 6 of annular configuration is gas-free in the inflated state of the side chamber 6 or the airbag 5, which is why less gas is required from the gas generator 11 for filling the airbag 5, whereby as a result the gas generator 11 itself may also be configured to be smaller. In order to carry out the production as simply as possible, in a further embodiment of the invention the spatial region 7 is configured in the same manner as the airbag 5, by means of two superimposed fabric layers. It is obvious to a person skilled in the art that the spatial region 7 may also have only one fabric layer or no fabric layer at all, and in this case it is possible to reach through the side chamber 6. In this case, the spatial region 7 serves for receiving the lateral upper body region of the occupant 13—oriented in the direction of the vehicle center—i.e. for example in the case of a vehicle licensed in Germany in which the driver sits on the left, in the case of the front seat passenger the left arm and the outer region of the left shoulder. By receiving the arm and the associated shoulder part the spatial region 7 serves, in particular, for positioning the shoulder chamber 8 of the airbag 5.

For implementing an inflation process of the side chamber 6 which is as rapid as possible, in a preferred embodiment this side chamber is at least partially separated from the shoulder chamber 8 in terms of flow technology by means of a stitched portion, wherein the gas generator 11 is preferably arranged on the side chamber 6, such that this side chamber is initially able to be filled with gas when an accident situation occurs. To this end, for example, an inlet opening for the gas from the gas generator 11 is provided on the side chamber 6. In the same manner, it is also possible that the side chamber 6 has an inlet connection element and/or an opening for receiving and/or introducing the gas generator 11, whereby potentially additional construction space may be saved.

In principle, it is also possible that the side chamber 6 and the shoulder chamber 8 are fully separated in terms of flow technology, wherein both the side chamber 6 and the shoulder chamber 8 are assigned a separate gas generator.

FIG. 9 to FIG. 12 show different means of fastening the anchoring strap B1*a*, B2*a*, B3*a*, B4*a* to the vehicle seat 2 and/or the seat frame 12 thereof, wherein in FIG. 13 the respective anchoring points B1, B2, B3, B4 on the vehicle seat 2 (B3) and/or the seat frame 12 thereof (B1, B2, B4) and the lower/road side (A1) and the upper/roof liner side (A2) fastening point A1, A2 for fastening the airbag 5 along and on the side rest 3 are shown. Moreover, in FIG. 13, the airbag 5 according to the invention is shown in dashed lines, wherein depending on the inclination of a backrest of the vehicle seat 2 and/or along the plane thereof a maximum vertical spacing y from the seat frame 12 is illustrated. It should be mentioned that a maximum horizontal spacing x of the airbag 5 from the seat frame 12 is irrespective of the inclination of the backrest of the vehicle seat 2. In detail, the airbag 5 protrudes in the vehicle vertical direction at a vertical spacing y of 50 mm to 300 mm, preferably 150 mm, beyond the seat frame 12 in the direction of the roof liner. In the same manner, the airbag 5 protrudes in the vehicle width direction at a horizontal spacing x of 0 mm to 190 mm, preferably 160 mm, from a region of the seat frame 12 facing the vehicle center in the direction of the vehicle door.

FIG. 9 shows according to the above embodiments a possible arrangement according to the invention of the at least one anchoring strap B1*a* fastened to the shoulder chamber 8, at the anchoring point B1 of the vehicle seat 2 arranged on the airbag side in the vicinity of the neck support 4. With an arrangement of the anchoring point B1 in the vicinity of the neck support 4, in the deploying and/or inflating process the anchoring strap B1*a* does not push onto the body and/or the shoulder of the occupant 13, whereby firstly it does not lead to any constriction of the occupant 13 and secondly to the occupant being displaced and/or pushed away out of the vehicle seat 2. Thus any painful constrictions of the occupant 13 during the accident are also avoided, since the anchoring strap B1*a* is guided over the shoulder of the occupant 13.

Figure 10:
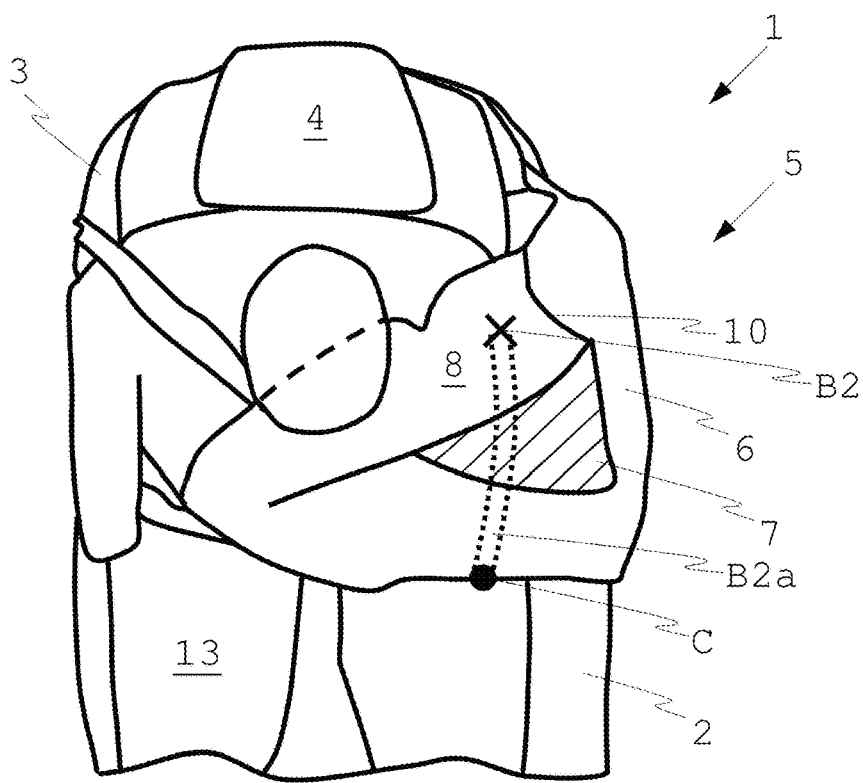
FIG. 10 shows a plan view of a second embodiment according to the invention of the restraint device in the deployed/inflated state, wherein the anchoring strap is arranged at an anchoring point on the seat frame on the airbag side.

Also according to FIG. 10, in a further embodiment of the invention it is possible that the anchoring strap B2*a* is arranged on the lower region on the shoulder chamber 8, i.e. on the side of the shoulder chamber 8 inclined toward the road, and the anchoring strap B2*a* is arranged centrally at a central anchoring point B2 on the seat frame 12 on the airbag side.

Figure 11:
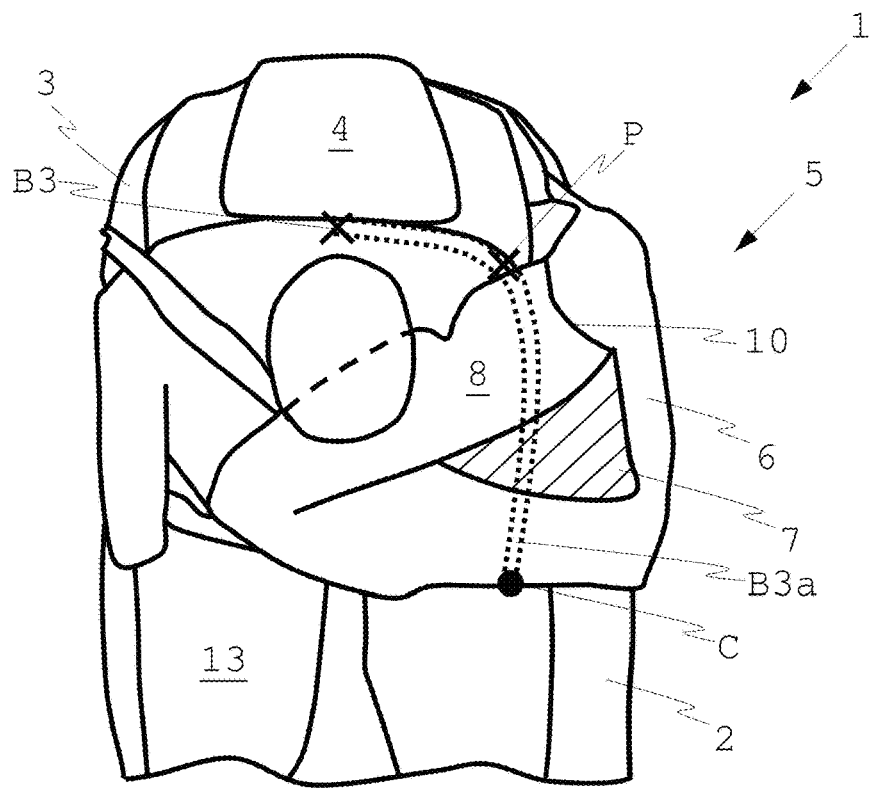
FIG. 11 shows a plan view of a third embodiment according to the invention of the restraint device in the deployed/inflated state, wherein the anchoring strap is arranged at an anchoring point in the seat center.
Figure 12:
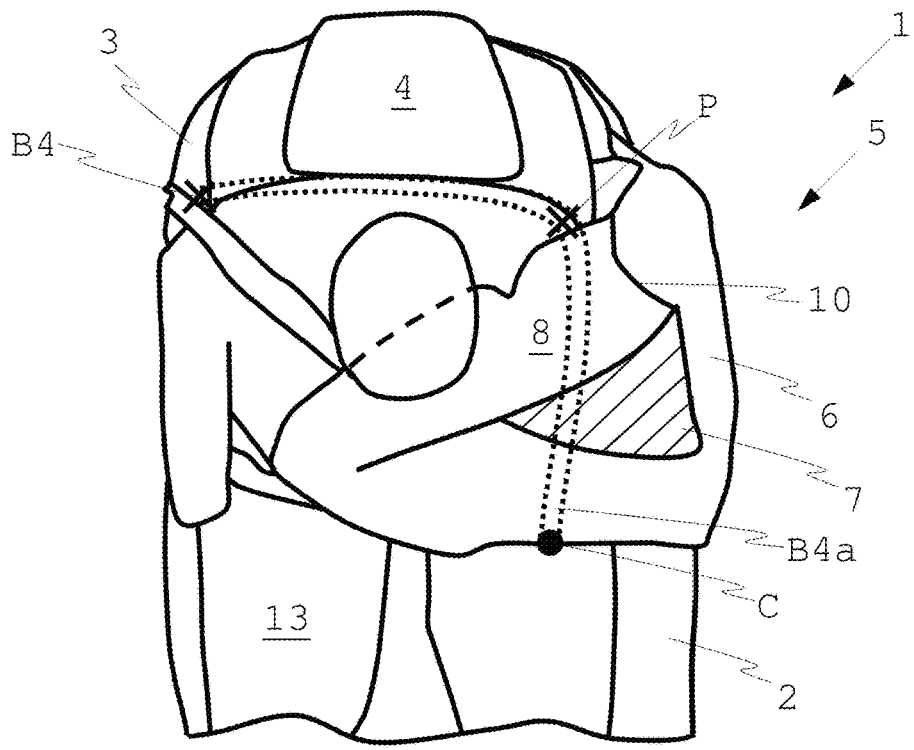
FIG. 12 shows a plan view of a fourth embodiment according to the invention of the restraint device in the deployed/inflated state, wherein the anchoring strap is arranged at an anchoring point on the seat frame on the vehicle door side.

Also according to FIG. 11, it is possible that the anchoring strap B3*a* arranged on the shoulder chamber 8 is arranged at an anchoring point B3 in the center of the seat. In an alternative embodiment, it is also possible that the anchoring strap B4*a* which is arranged on the shoulder chamber 8 is arranged on the side opposing the airbag 5 at an anchoring point B4 on the seat frame 12. In the case of an anchoring point B3 in the center of the seat or an anchoring point B4 on the vehicle door side, however, the drawback arises that the occupant 13 is pushed forward by the anchoring strap B3*a*, B4*a* during the deployment process of the airbag 5. In order to prevent this, the anchoring strap B3*a*, B4*a* runs via a deflection point P which is arranged on the airbag side on the seat frame 12. The anchoring strap B3*a*, B4*a* is guided further behind the seat cover via the deflection point P to the anchoring point B3, B4, whereby the body of the occupant 13 is prevented from being constricted and pushed away or pushed forward out of the seat.

Such a restraint device 1 according to the invention shown in FIG. 1 to FIG. 13 permits a shoulder region of the occupant 13 to be able to be retained by means of the shoulder chamber 8 and optionally also by means of the sail-like portion 9 when an accident situation occurs.

Figure 14:
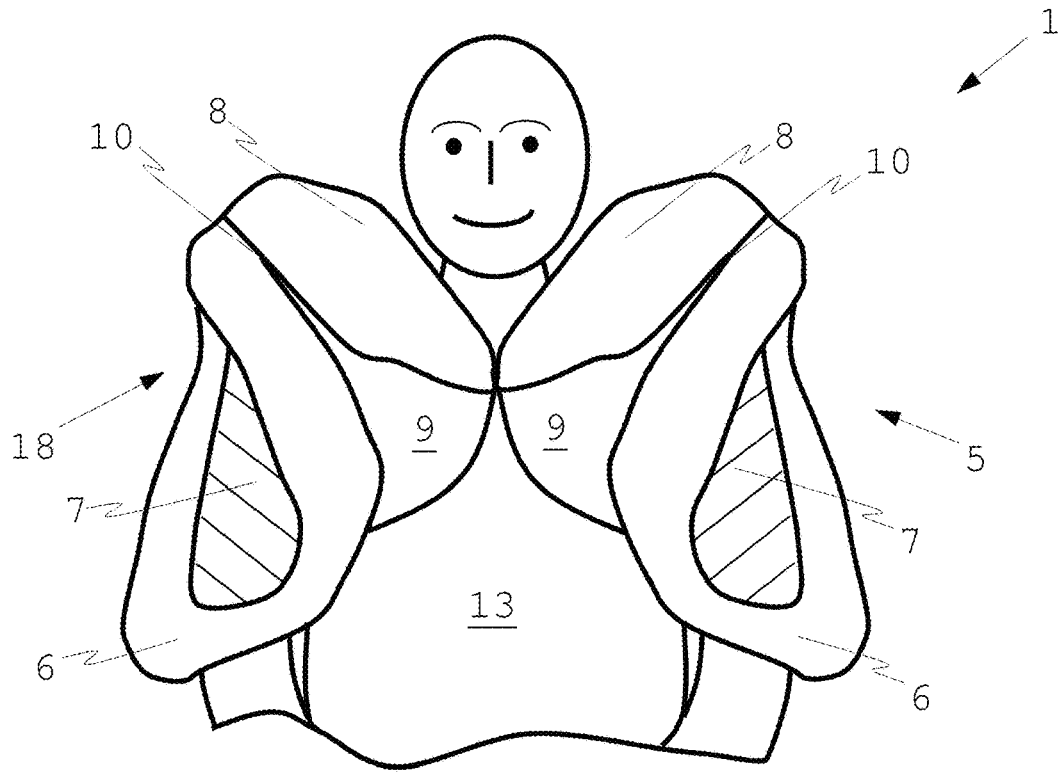
FIG. 14 shows a front view of an alternative embodiment of the restraint device according to the invention in the deployed/inflated state according to FIG. 5, wherein in this case one respective airbag is arranged on either side of the vehicle seat, said airbags holding the occupant in position.

FIG. 14 shows that in an alternative embodiment it is also possible that an additional airbag 18 is arranged on the side rest 3 of the vehicle seat 2 on the vehicle door side, wherein the additional airbag 18 is preferably configured according to the airbag 5 in the vehicle center. By an arrangement of the restraint system 1 according to the invention on both side rests 3 of the vehicle seat 2 a protection of the vehicle occupant 13 is provided, irrespective of the position of the vehicle seat 2 in the vehicle. Such safety systems will be particularly important in the future during periods of autonomous driving.

Figure 16:
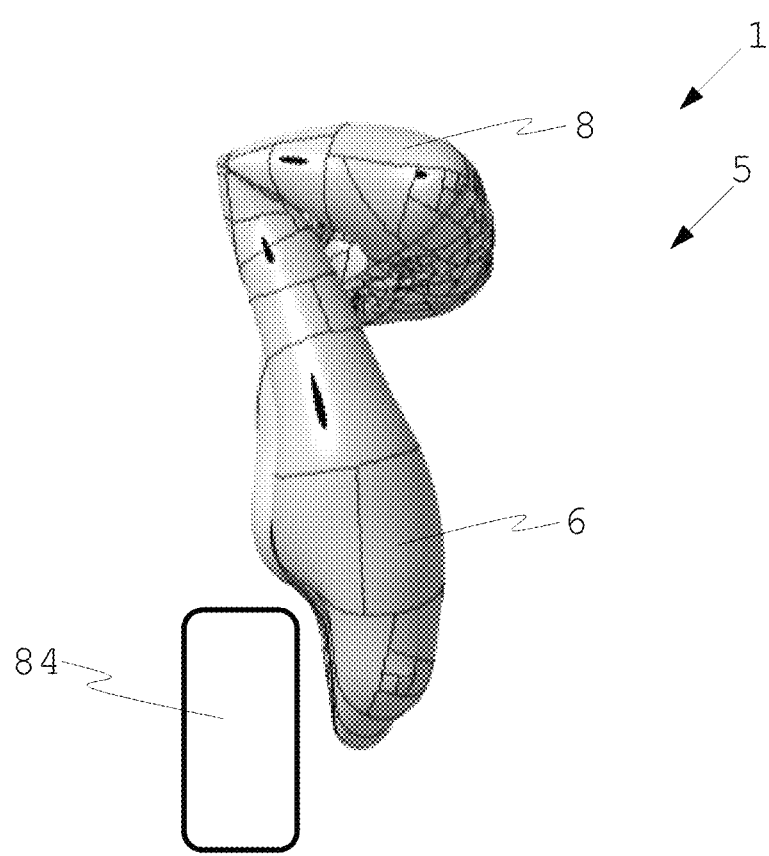
FIG. 16 shows a side view of a further airbag according to the invention which is in the deployed/inflated state and which is supported on a central console.

In a further embodiment according to the invention, according to FIG. 16 it is possible that the airbag 5 in the deployed/inflated state is supported on a central console 84. This embodiment has the advantage that the anchoring strap B1*a* does not have to be fastened at its one end in the vicinity of the neck support 4 on the vehicle seat 2, such that the shoulder chamber 8 is positioned by means of the anchoring strap B1*a* in the vicinity of the neck support 4. As a result, it is also possible to dispense entirely with the anchoring strap B1*a*, whereby any additional costs, in particular material and mounting costs, may be saved. In this case, the forces produced by the occupant when plunging into the airbag 5 are substantially absorbed by the central console 84, for which purpose the side chamber 6 is optionally configured to be longer than in the embodiments described above. In other words, the side chamber 6 is configured, in particular, to be elongated such that in the inflated/deployed state of the airbag 5 it is supported on the central console 84.

Moreover, with closer observation of FIG. 16 it is apparent that the main extension planes of the side chamber 6 and the shoulder chamber 8 adopt an angle of 45 to 120 degrees, preferably 70 to 100 degrees, from one another so that the shoulder chamber 8 is arranged to be approximately perpendicular to the head of an occupant 13. This is preferably achieved by means of the sail-like portion 9, wherein it is also possible to achieve this by means of potential retainer straps and by tightening and/or stretching one of the two superimposed layers which in the connected and/or bonded and/or stitched state form the airbag. Moreover, it is technically possible that one of the two layers is configured to be longer in comparison with the opposing layer and has a Z-shaped fold.

It is furthermore pointed out that the features of the individually described exemplary embodiments of the invention can be combined in various combinations with one another. Where areas are defined, they include all the values within these areas and all the sub-areas falling within an area.

The invention claimed is:

1. A restraint device, in particular for a motor vehicle, for reducing an abrupt sideward movement and/or forward movement of an occupant in the case of an impact with an airbag which is inflatable by means of a gas generator when an accident situation occurs, wherein:
   the airbag is arranged by means of at least one fastening element at an associated vehicle seat fastening point on a side of a side rest of a vehicle seat facing a vehicle interior,
   the restraint device comprises at least one anchoring strap, the one end thereof being fastened at an airbag fastening point to the airbag,
   the airbag has at least one side chamber and one shoulder chamber which are connected together, wherein in the inflated state of the airbag the side chamber and the shoulder chamber form different main extension planes which run at an angle to one another,
   the airbag fastening point is configured on the shoulder chamber so that the anchoring strap is fastened at one end to the shoulder chamber,
   the other end of the anchoring strap is fastened at an anchoring point to the vehicle seat,
   the shoulder chamber comprises two regions which transition into one another at a bending line of the shoulder chamber and which together form a reverse U-shaped region, a base of the reverse U-shaped region in the inflated state of the shoulder chamber forming an upper end of the shoulder chamber,
   a first region of the two regions is connected to the side chamber and a second region of the two regions is folded back onto the side chamber,
   the second region which is folded back onto the side chamber faces the occupant; and
   the two regions of the shoulder chamber which together form the reverse U-shaped region are arranged substantially symmetrically to one another, wherein the plane of symmetry between the two regions includes the bending line and forms a main extension plane of the shoulder chamber.

2. The restraint device as claimed in claim 1, wherein the second region of the shoulder chamber is connected to the side chamber by means of a sail-like portion.

3. The restraint device as claimed in claim 2, wherein the sail-like portion is configured to be triangular.

4. The restraint device as claimed in claim 1, wherein the side chamber forms a main extension plane which extends substantially in the vehicle longitudinal direction and the vehicle vertical direction.

5. The restraint device as claimed in claim 1, wherein the shoulder chamber forms a main extension plane which extends substantially in the vehicle longitudinal direction and obliquely to the vehicle vertical direction and at the same time extends in the direction of the shoulder of an occupant seated in the vehicle seat.

6. The restraint device as claimed in claim 1, wherein in the inflated state of the airbag the main extension planes of the side chamber and the shoulder chamber adopt an angle of 50 degrees to 130 degrees to one another.

7. The restraint device as claimed in claim 1, wherein the side chamber and the shoulder chamber transition into one another by means of a bent region, wherein the main extension planes intersect in the bent region, and wherein the bending line of the shoulder chamber is above the bent region.

8. The restraint device as claimed in claim 1, wherein the anchoring strap is fastened at its other end to the vehicle seat in the vicinity of the neck support, so that the shoulder chamber is positioned in the vicinity of the neck support by means of the anchoring strap.

9. The restraint device as claimed in claim 1, wherein the anchoring strap is arranged centrally at a central anchoring point on the airbag side on the seat frame.

10. The restraint device as claimed in claim 1, wherein the anchoring strap is arranged at an anchoring point in the center of the seat or on a side opposing the airbag at an anchoring point on the seat frame.

11. The restraint device as claimed in claim 10, wherein the anchoring strap is deflected via a deflection point from the airbag fastening point to the anchoring point.

12. The restraint device as claimed in claim 1, wherein the side chamber and the first region as connected are in an annular configuration, wherein a ring which is formed as part of the annular configuration defines a main extension plane of the side chamber.

13. The restraint device as claimed in claim 12, wherein a spatial region is enclosed by the ring and wherein said spatial region is gas-free in the inflated state of the side chamber or the airbag.

14. The restraint device as claimed in claim 1, wherein the side chamber and the shoulder chamber are at least partially separated from one another in terms of flow technology by means of a stitched portion.

15. The restraint device as claimed in claim 1, wherein the gas generator is arranged on the side chamber such that when an accident situation occurs said side chamber is initially able to be filled with gas.

16. The restraint device as claimed in claim 1, wherein the airbag protrudes in the vehicle vertical direction at a vertical spacing of 50 mm to 300 mm, beyond the seat frame in the direction of the roof liner.

17. The restraint device as claimed in claim 1, wherein the airbag protrudes in the vehicle width direction at a horizontal spacing of 0 mm to 190 mm from a side region of the seat frame facing the vehicle center, in the direction of the vehicle door.

18. The restraint device as claimed in claim 1, wherein an additional airbag is arranged on the side rest of the vehicle seat on the vehicle door side, said airbag being configured so as to correspond to the airbag.

19. The restraint device as claimed in claim 1, wherein the side chamber is configured such that in the inflated/deployed state of the airbag it is suitable for being supported on a central console.

20. A restraint device, in particular for a motor vehicle, for reducing an abrupt sideward movement and/or forward movement of an occupant in the case of an impact with an airbag which is inflatable by means of a gas generator when an accident situation occurs, wherein:
   the airbag is arranged by means of at least one fastening element at an associated vehicle seat fastening point on a side of a side rest of a vehicle seat facing a vehicle interior,
   the restraint device comprises at least one anchoring strap, the one end thereof being fastened at an airbag fastening point to the airbag,
   the airbag has at least one side chamber and one shoulder chamber which are connected together, wherein in the inflated state of the airbag the side chamber and the shoulder chamber form different main extension planes which run at an angle to one another,
   the airbag fastening point is configured on the shoulder chamber so that the anchoring strap is fastened at one end to the shoulder chamber, the other end of the anchoring strap is fastened at an anchoring point to the vehicle seat, the shoulder chamber comprises two regions which transition into one another at a bending line of the shoulder chamber and which together form a reverse U-shaped region, a base of the reverse U-shaped region in the inflated state of the shoulder chamber forming an upper end of the shoulder chamber, a first region of the two regions is connected to the side chamber and a second region of the two regions is folded back onto the side chamber, the second region of the shoulder chamber faces the occupant, the second region of the shoulder chamber is connected to the side chamber by means of a sail-like portion, the sail-like portion is configured to be triangular to protect the occupant from any forward movement during the occurrence of an accident; and the two regions of the shoulder chamber which together form the reverse U-shaped region are arranged substantially symmetrically to one another, wherein the plane of symmetry between the two regions includes the bending line and forms a main extension plane of the shoulder chamber.

* * * * *